US012743310B1

(12) United States Patent
Yuan et al.

(10) Patent No.: US 12,743,310 B1
(45) Date of Patent: Sep. 22, 2026

(54) HEAT MANAGEMENT IN A SERVERLESS MANAGED DATABASE SERVICE IN A CLOUD PROVIDER NETWORK

(71) Applicant: Amazon Technologies, Inc., Seattle, WA (US)

(72) Inventors: Yuhui Yuan, Seattle, WA (US); Ashok Kurakula, Bothell, WA (US); Jiaming Yan, Seattle, WA (US); Bradley Barnhart, Seattle, WA (US); Jiahua Kang, Seattle, WA (US); Arjun Muthukrishnan, Bellevue, WA (US); Lei Zeng, Irvine, CA (US); Milan Matejka, Everett, WA (US); Sharon Chen, Seattle, WA (US); Aravinthan Narayanan, Black Diamond, WA (US); Anthony Paul Hooper, Toronto (CA); Grant A. McAlister, Morro Bay, CA (US); Marc Brooker, Seattle, WA (US); Yang Li, Seattle, WA (US); Alexander Tam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 678 days.

(21) Appl. No.: 17/958,066

(22) Filed: Sep. 30, 2022

(51) Int. Cl.
*G06F 9/50* (2006.01)
*G06F 9/48* (2006.01)

(52) U.S. Cl.
CPC .............. *G06F 9/5027* (2013.01); *G06F 9/48* (2013.01); *G06F 9/4806* (2013.01); *G06F 9/4843* (2013.01); *G06F 9/485* (2013.01); *G06F 9/4862* (2013.01); *G06F 9/4881* (2013.01); *G06F 9/4893* (2013.01); *G06F 9/50* (2013.01); *G06F 9/5005* (2013.01); *G06F 9/505* (2013.01);
(Continued)

(58) Field of Classification Search
CPC ........ G06F 9/48; G06F 9/4806; G06F 9/4843; G06F 9/485; G06F 9/4862; G06F 9/4881; G06F 9/4893; G06F 9/50; G06F 9/5005; G06F 9/505; G06F 9/5027; G06F 9/5061; G06F 9/5077; G06F 9/5083; G06F 9/5088; G06F 9/5094
See application file for complete search history.

(56) References Cited

U.S. PATENT DOCUMENTS 12,056,024 B1 * 8/2024 Mathad .................. G06F 9/505
2013/0151680 A1 * 6/2013 Salinas ............... G06F 9/45558
709/223

(Continued)

*Primary Examiner* — Charles M Swift
(74) *Attorney, Agent, or Firm* — Nicholson De Vos Webster & Elliott LLP

(57) ABSTRACT

Techniques for heat management in a serverless managed database service in a cloud provider network are described. The service receives a request to launch a database instance that can scale resource usage based on a computing resource demand of a database application. A set of candidate host computer systems to host the database instance is identified. A host resource usage metric of each host computer system in the set of candidate host computer systems is obtained. A host computer system from the set of candidate host computer systems is selected to host the database instance, the selection based at least in part on the host resource usage metric of the selected host computer system. The database instance is launched on the selected host computer system.

20 Claims, 10 Drawing Sheets

(52) U.S. Cl.
CPC .......... *G06F 9/5061* (2013.01); *G06F 9/5077* (2013.01); *G06F 9/5083* (2013.01); *G06F 9/5088* (2013.01); *G06F 9/5094* (2013.01)

(56) References Cited

U.S. PATENT DOCUMENTS

| | | | | |
|---|---|---|---|---|
| 2013/0346613 | A1* | 12/2013 | Tarasuk-Levin | G06F 9/4856 709/226 |
| 2014/0282520 | A1* | 9/2014 | Sabharwal | G06F 9/455 718/1 |
| 2021/0117303 | A1* | 4/2021 | Azmandian | G06F 17/15 |
| 2022/0171787 | A1* | 6/2022 | Chen | G06F 16/9017 |
| 2024/0289170 | A1* | 8/2024 | Toal | G06F 9/5083 |

* cited by examiner

HEAT MANAGEMENT IN A SERVERLESS MANAGED DATABASE SERVICE IN A CLOUD PROVIDER NETWORK

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for heat management in a serverless managed database service in a cloud provider network. In this context, "serverless" refers to the ability of users to deploy database applications with the managed database service without having to launch and provision the underlying virtualized instances (e.g., virtual machines, containers). Under the hood, however, the managed database service manages virtualized instances (or just "instances") to execute user's database applications ("database instances").

Untethering database applications from user-managed instances has several advantages. For example, since database applications typically have periods of relatively high and low activity, the managed database service can pack multiple database instances onto a single underlying host computer system (or just "host"). As another example, since users do not expect serverless offerings to be limited to a single instance type having some amount of various compute resource capacity, the managed database service can allow the database applications to scale up and down on-demand. These advantages are not without a cost. When many database instances are executed on a single host, allowing them to scale on-demand can result in the host's resource capacity being overwhelmed.

To avoid overwhelming host capacity with database instance demand, the managed database service deploys heat management services. "Heat" of a host can refer to the activity level or resource usage of the database instances executing on that host-hosts with higher resource usage are relatively hotter than other hosts having relatively lower resource usage. The heat management services of the managed database service can collect metrics related to database instance-level and/or host-level resource usage and/or activity levels. Using the collected metrics, the heat management services can address the problem is two ways-one to mitigate and the other to remediate heat buildup. A placement engine mitigates heat buildup by selecting "cooler" hosts for new database instance launches or existing database migrations. A heat engine remediates heat buildup by identifying and causing the migration of database instances from "hot" hosts to "cooler" hosts.

Figure 1:
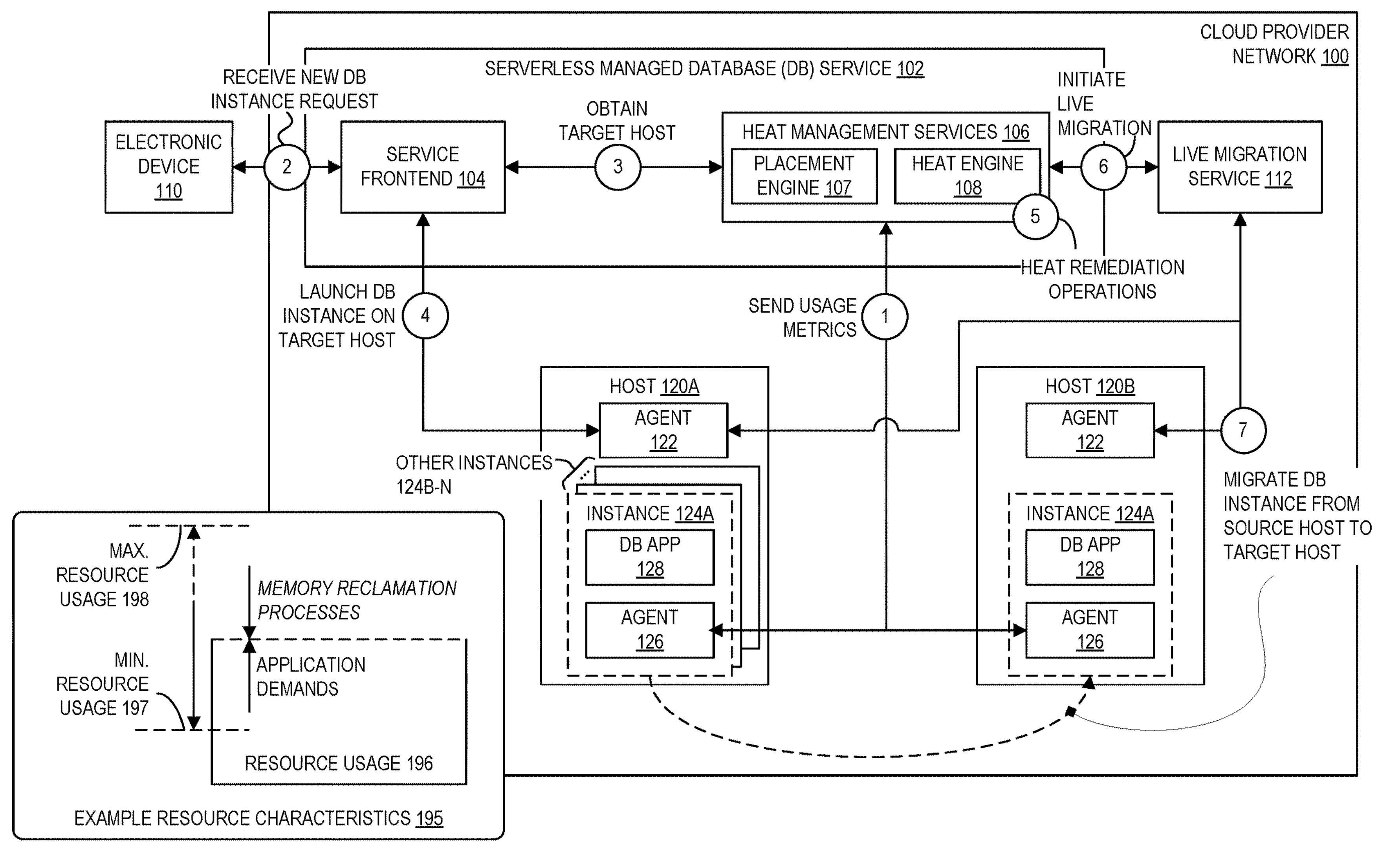
FIG. 1 illustrates an exemplary system including a serverless managed database service provided by a cloud provider network according to some examples.

FIG. 1 illustrates an exemplary system including a serverless managed database service provided by a cloud provider network according to some examples. A cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may use electronic device(s) 110 to interact with a provider network 100 across one or more intermediate networks (e.g., the internet) via one or more interface(s), such as through use of application programming interface (API) calls, via a console implemented as a website or application, etc.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Generally, the traffic and operations of a provider network can broadly be subdivided into two categories: control plane operations carried over a logical control plane and data plane operations carried over a logical data plane. While the data plane represents the movement ofuser data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

Cloud provider networks often provide a variety of services. Some of these services may be considered managed services. Managed services provide users with access to an underlying resource or application while simplifying or otherwise abstracting many of the technical details associated with the provisioning of the resource or application. One type of managed service that a provider network may provide may be referred to as a "managed compute service" that executes code or provides computing resources for its users in a managed configuration.

An example managed compute service is a hardware virtualization service. A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The cloud provider network 100 includes a serverless managed database (DB) service (SMDBS) 102. The SMDBS 102 includes a service frontend 104 and heat management services 106. Typically, the SMDBS and components thereof are implemented as code (e.g., executable instructions, one or more computer programs, or one or more applications) executing on one or more processors of one or more computer systems (not shown). Communications between the SMDBS components are typically carried out via API. The SMDBS typically includes a host tracking metadata datastore to track the state of each host (e.g., which instances are running on the host, whether the host is a target for any placement or migration operations, etc.) and a metrics datastore (e.g., to store collected performance metrics from each host). Such datastores can be provided by another database service of the provider network.

As illustrated, the cloud provider network 100 includes two hosts 120A and 120B which support DB instances. In practice, many more hosts are present within the cloud provider network 100. In some examples, the SMDBS 102 can have an assigned fleet of dedicated hosts for providing "serverless" database instances, the dedicated hosts from some portion of the overall host fleet of the cloud provider network 100. Each host includes a host agent 122 of the SMDBS 102 to perform various operations. The host agents 122 are typically implemented as code executed within the host environment of the hosts 120.

At a high level, the service frontend 104 provides one or more APIs through which customers can interact with the SMDBS 102. Example interactions include launching a serverless database instance, modifying a serverless database instance, and terminating a serverless database instance. The heat management services 106 include a placement engine 107 and a heat engine 108. The placement engine 106 mitigates heat buildup by selecting "cooler" hosts for new database instance launches or existing database migrations. The heat engine 108 remediates heat buildup by identifying and causing the migration of database instances from "overheated" hosts to "cooler" hosts.

Various operations of the SMDBS 102 are now described with reference to the circle numbers (1) through (7). As indicated at circle (1), the instance agents 126 report resource usage metrics to the SMDBS 102, which the SMDBS 102 can store in the metrics datastore. Various metrics and their collection are described in greater detail with reference to FIG. 3. For now, the metrics are used by the heat management services 106 as part of placement and heat management operations.

As indicated at circle (2), an electronic device 110, which may be operated on behalf of a customer, issues a request to the service frontend 104, the request to launch a new serverless database instance. Although the electronic device 110 is illustrated here as external to the cloud provider network 100, in other examples the electronic device issuing the request may be within the cloud provider network 100. The request can include one or more configuration parameters such as the database application to launch (e.g., MySQL, PostgreSQL) and the version of the database application.

In some examples, the request includes an identification of a minimum and a maximum performance level (or resource consumption) to allow for the serverless database instance. In some examples, a default minimum and maximum may be used. The bottom left inset shows example resource characteristics 195 for a serverless database instance. As indicated, the resource usage 196 of the serverless database instance can range between a minimum resource usage 197 and a maximum resource usage 198. The resources allotted to the serverless database instance scale on-demand to the applications needs between these two limits. While usage of resources like compute and network throughput typically scale-down automatically due to DB application needs, memory allocations may or may not. In the latter case, various memory reclamation processes may be used to reduce memory allocations to a DB application or instance.

The total maximum resource usage of the database instances hosted on a host (when more than one) can and often does exceed the total resources of the host. For example, a host system with 256 gigabytes (GB) of memory might host eight database instances, each having a maximum memory usage of 64 GB. Since database instance resource usage is often variable in nature, provided the eight database instances all do not attempt to peak during the same period of time.

At circle (3), the service frontend 104 issues a request to the HMS 106, the request for an identification of a host on which to launch the requested database instance. The service frontend 104 obtains an identifier of a host 120 system from the HM6 106. An exemplary host identifier is a network address. To provide a host identifier, the HMS 106 executes a placement engine 107. The placement engine 107 can be executed in response to a placement request such as the one received from the service frontend 104 or, as described below, from the heat engine 108. At a high level, the placement engine 107 evaluates a set of candidate hosts 120 by executing a ranker to score the hosts and returns the host identifier associated with the "best" score. Additional details related to the placement engine 107 are described in greater detail with reference to FIG. 4.

As indicated at circle (4), the service frontend 104 issues a request to the host agent 122 of a host 120 identified at circle (3), the request to launch a database instance based on the request at circle (2). In some examples, the agent 122 receives the launch request indirectly from the service frontend 104, such as via a hardware virtualization service. Here, the database instance 124A is successfully launched on host 120A with the database application 128 identified in the request at circle (2). Note that a database instance is typically launched from a machine or container image, depending on the virtualization technology being used. The host may also be host to zero or more other database instances 124B-124N. The launched DB instance 124A operates within an environment shared with an instance agent 126. The instance agent 126 reports metrics related to the database application 128 to the host agent 122. Once successfully launched, the service frontend 104 can receive an indication of the successful launch from the agent 122 or hardware virtualization service (not shown), and the service frontend 104 can provide an identifier of the launched database instance to the electronic device 110. Such an identifier may be a network address that a user can use to interact with the database. As a serverless managed service, the customer is typically unaware of the underlying virtualization technology used to support the database instance.

As indicated at circle (5), the heat engine 108 performs heat remediation operations. These operations are typically part of an online process that runs continuously to manage heat across the fleet of hosts 120. Exemplary heat remediation operations include identifying hosts that require remediation, selecting a host from the identified hosts for remediation (a "source" host), selecting a database instance on the selected host to move off the host, obtaining an identification of a host on which to move the selected database instance (a "target" host), and initiating a live migration of the selected database instance from the "source" host to the "target" host. Additional details related to the heat engine 108 are described in greater detail with reference to FIG. 4.

For example, at some point after the database instance 124A was launched, the heat engine 108 may identify and select the host 120A for remediation, and further select the database instance 124A as the database instance to migrate. The heat engine 108 can obtain an identifier of a host 120 system from the placement engine 107. Here, the placement engine 107 provides the identifier of host 120B.

As indicated at circle (6), the heat engine 108 can issues a request to a live migration service 112 of the cloud provider network 100, the request to migrate the database instance 124A from host 120A to host 120B.

As indicated at circle (7), the live migration service 112 manages the migration of the database instance 124A from host 120A to host 120B in coordination with the agents 122 of the hosts. Live migration refers to the process of moving a running instance between different hosts without significantly disrupting the availability of the instance (e.g., the down time of the instance is not noticeable by an end user). The live migration service 112 manages the live migration of instances from a "source" host to a different "destination" host. After identifying a candidate destination host, the live migration service 112 can then cause the state (e.g., vCPU registers, memory, storage data, network connectivity, etc.) of the instance in an "active" domain to be captured on the source host, transferred to the destination host, and loaded into the corresponding state data for the instance in an "inactive" domain on the destination host system. For example, a local migration manager running on the source host can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of a control plane component, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded.

In some examples, the customer may submit a request to the service frontend 104, the request to update a configuration of a running database instance (e.g., the minimum and/or maximum resource usages 197, 198). The request can include an identification of the instance. The service frontend 104 can relay the request to the HMS 106. Using the instance identifier, the HMS 106 can identify the host on which the instance is running. For decreases in usage, the HMS 106 can send a request to the agent 122 of the identified host 120, the request including an identification of the instance and of the new, decreased usage level(s). For increases in usage, the HMS 106 can evaluate whether the request can be granted on the existing host given the resource metrics associated with the host. If there is sufficient excess capacity on the host, the HMS 106 can send a request to the agent 122 of the identified host 120, the request including an identification of the instance and of the new, increased usage level(s). If there is not sufficient excess capacity on the host, the HMS 106 can executes a placement engine 107 for an instance having the new requirements to identify a host system with sufficient capacity. The HMS 106 can then initiate a live migration via the live migration service 112 of the database instance to the identified host. Once migration is complete, the HMS 106 can send a request to the agent 122 of the new host 120, the request including an identification of the instance and of the new, increased usage level(s).

In some examples, the heat engine 108 can impose temporary "freezes" to on-demand performance increases for all database instances on a host. For example, if the heat engine 108 identifies a host with a heat level above a threshold, the heat engine 108 can send a request to the agent 122 of the host, the request causing the agent 122 to freeze the performance level of all hosted database instances at their current state. Once remediation has occurred, the heat engine 108 can send a request to the agent 122 of the host to life the restriction.

In some examples, the host tracking metadata includes a flag for each host to indicate whether the host is a target of a placement operation (whether a new instance or an existing instance being migrated). In some examples, the flag can be an instance identifier (e.g., that is assigned by the SMDBS 102 and uniquely identifies a database instance). The HMS 106 can use the flag to determine whether to consider the host for heat management operations. For example, the placement engine 107 can mark hosts that are the targets of pending placement operations in the tracking metadata. Subsequent placement operations can remove hosts with such a flag from consideration. Once the placement operation is complete, the HMS 106 can remove the flag. In some examples, completion of the placement operation is inferred once the instance begins reporting metrics from the host.

Figure 2:
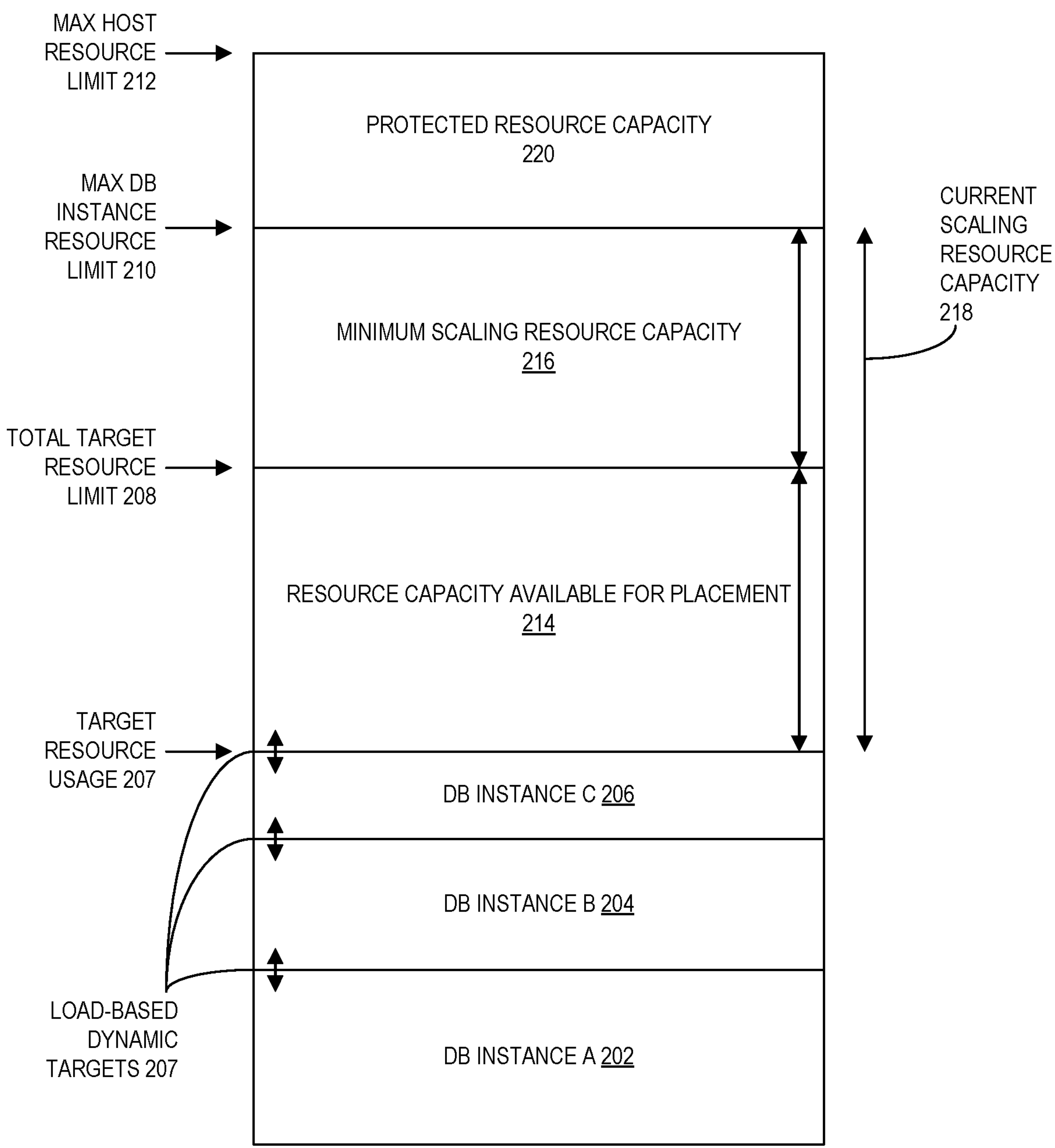
FIG. 2 illustrates an exemplary technique for tracking resources of a host for a serverless managed database service according to some examples.

FIG. 2 illustrates an exemplary technique for tracking resources of a host for a serverless managed database service according to some examples. Hosts can have many resource dimensions such as compute usage, memory usage, local storage usage, network usage (which may be split into network storage usage (e.g., to a storage service of the provider network, to the storage layer of the database, etc.) and other network usage (e.g., non-network storage traffic)). Each resource has a finite limit based on the hardware configuration of the host. For example, a host may have two 32-core processors, 256 gigabytes (GB) of memory per-processor, up to 40 gigabits per second (Gb/s) network storage bandwidth, and up to 100 Gb/s other network bandwidth. In some examples, the host capacity available for DB instances is divided up into equally sized capacity units ("CUs"). The above example host may support 512 CUs (256 per processor).

The resource usage of one resource dimension or in CUs of a host is illustrated from bottom (e.g., no usage) to top (e.g., resource exhausted) with three DB instances A, B, and C is shown. As indicated above, a DB instance can have an associated minimum and maximum resource usage or performance level that provide a range within which the DB instance operates. The actual performance level at which a DB instance is operating is referred to as the "target" level. The target level for each DB instance is dynamically "scaled" to DB application demand within its associated range, subject to certain limits, and may scale up or down in CUs. Here, DB instances A, B, and C, have targets 207 as indicated, respectively "consuming" the amounts of resources 202, 204, and 206. The target resource usage 207 represents the aggregate resource usage of the DB instances.

Three exemplary limits are illustrated. A total target resource limit 208 represents a limit of the total target levels of each DB instance. (When the total target resource limit 208 is reached, the HMS 106 can facilitate additional increases for each DB instance by causing the migration of a DB instance another host.) A maximum DB instance resource limit 210 represents a limit to protect a reservation of the resource for other on-host operations (indicated as protected resource capacity 220). A maximum host resource limit 212 represents resource exhaustion of the resource.

A resource capacity available for placement 214 represents additional capacity that the HMS 106 can use to place instances. The capacity 214 represents the difference between the target resource usage 207 and the total target resource limit 208. A minimum scaling resource capacity 216 represents the minimum additional capacity that DB instances can use to increase their performance on demand. The capacity 216 represents the difference between the total target resource limit 208 and the maximum DB instance resource limit 210. Given the target resource usage 207 is below the total target resource limit 208, the current scaling resource capacity 218 is greater than the capacity 216.

In some examples, the scaling up or down is per-resource. In other examples, while the need to scale up or down may be based on the DB application needs for a single resource, the target level for the DB instance is increased along all resource-dimensions. For example, CUs may be an indivisible unit (e.g., one CU is ~0.4% processor time, 1 GB memory, ~78 megabits/s (Mb/s) network storage bandwidth, and 195 MB/s other network bandwidth).

Figure 3:
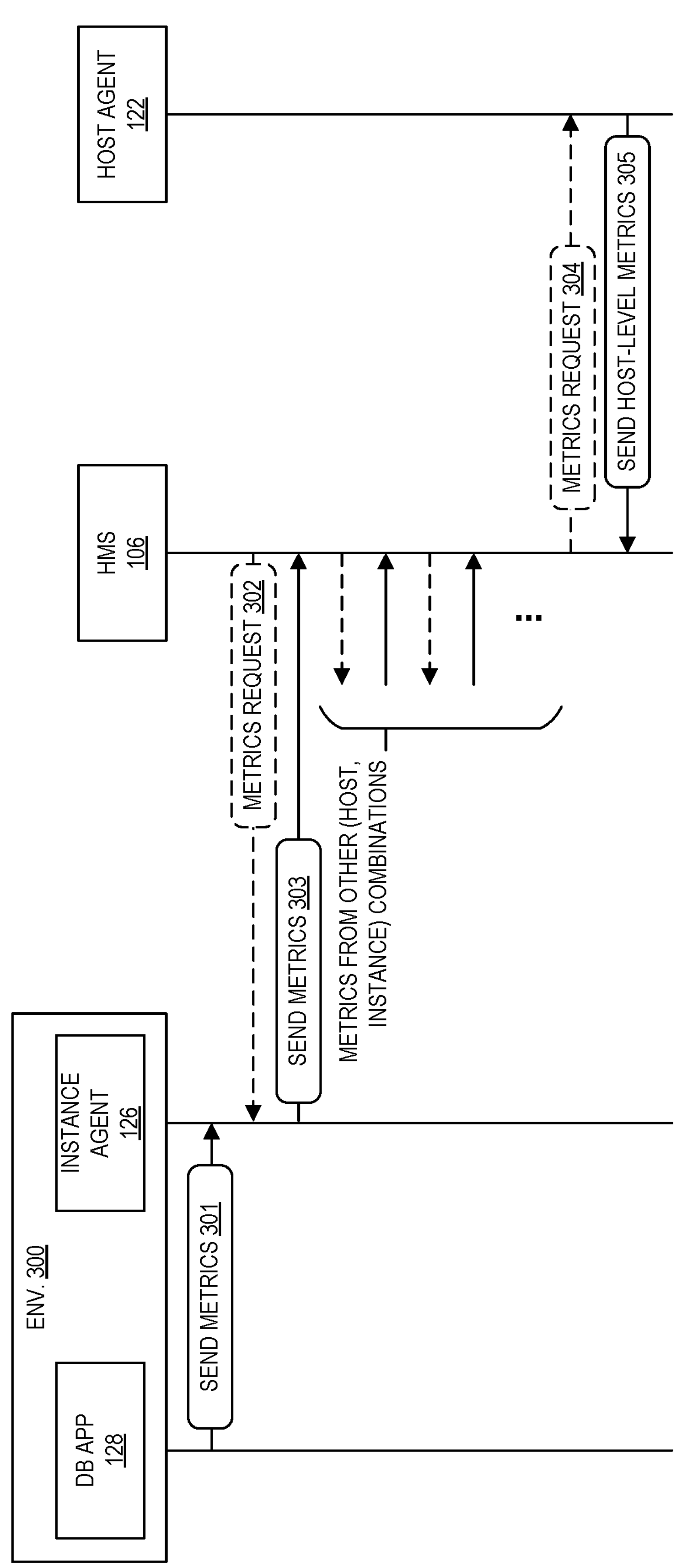
FIG. 3 is a call flow diagram illustrating operations related to metrics collection in for a serverless managed database service according to some examples.

FIG. 3 is a call flow diagram illustrating operations related to metrics collection in for a serverless managed database service according to some examples. An exemplary set of metrics reporting operations is illustrated. In this example, the HMS 106 obtains instance-level usage metrics from the instance agents 126 operating in the same environment 300 (e.g., a guest virtual machine operating system, a container, etc.) as the DB application 128.

At 301, the instance agent 126 obtains process-level metrics for the DB application 128. While illustrated as obtaining metrics from the DB application 128, the instance agent 126 would typically obtain process-level metrics from another entity or resource of the environment 300. For example, the instance agent 126 can use various OS-level tools or data to obtain the metrics (e.g., Linux/proc, top, etc.). At 303, the instance agent 126 sends the metrics associated with the DB application 128 to the host agent 122. In some examples, metrics are reported at an approximately one second interval to allow the HMS 106 to respond to rapid changes in database application activity levels.

An exemplary set of metrics include the following:

| Metric | Example Units |
|---|---|
| CPU_USAGE | % utilization of the core(s) assigned to the DB instance |
| MEM_USAGE | Memory footprint in Gigabytes (GB) |
| NETWORK_STORAGE_THROUGHPUT | Data (in Gb) transferred to/from off-host network storage services over last period of time |
| NETWORK_THROUGHPUT | Data (in Gb) transferred to/from other network locations over last period of time |
| RESOURCE_TARGET | Current resource target (may be per-resource, in CUs, of the highest resource usage in CUs, etc.) |
| LOCAL_STORAGE_THROUGHPUT | Measurement of local storage throughput in input/output operations per second ("IOPS") |

Of course, various other metrics may be reported and used. For example, a daemon may execute within the environment 300 (e.g., as a kernel thread) to monitor detailed metrics such as a page mutation rate associated with the database application process(es). The instance agent 126 can obtain the metrics from the daemon.

In some examples, the metrics reporting occurs via push transactions. For example, the instance agent 126 can push metrics to the HMS 106 at an approximately regular cadence. In other examples, pull transactions are used (e.g., as part of a polling process). For example, the UNMS 106 can issue a request 302 at an approximately regular cadence to the instance agent 126 of each database instance.

In other examples (not shown), host agents 122 can aggregate instance-level metrics from each of the instance agents 126 and send the set of metrics per-instance to the TIN/S 106. The set can include a set of instance identifiers to identify each DB instance and, for each instance identifier, the process-level metrics for the DB application executed therein.

In some examples, the TIN/S 106 calculates one or more aggregate metrics from the metrics reported by the host agent 122. For example, the TIN/S 106 can calculate the target resource usage 207 based on a sum of the current targets of each instance hosted by the host.

In some examples, the host agent 122 can report host-level usage metrics to the TIN/S 106 as indicated at 305. Again, such metrics can be sent in response to a request 304. Such metrics can include an overall compute, memory, and/or network throughput usage of the host and may be used to detect discrepancies between the aggregate instance-level metrics on a given host from each of the instance agents 126 and the hosts overall resource usage levels.

Figure 4:
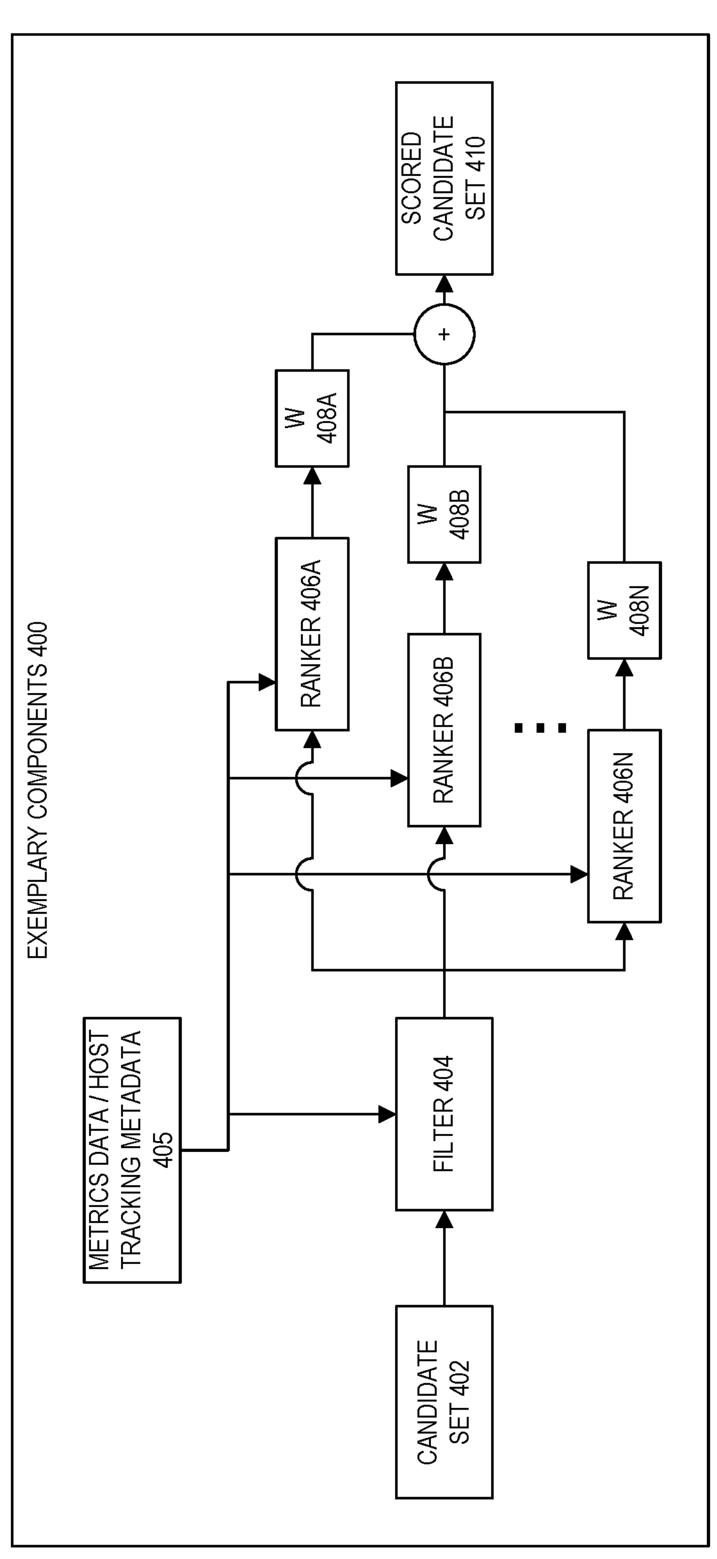
FIG. 4 illustrates an exemplary system including components of an exemplary heat management service of the serverless managed database service of FIG. 1 according to some examples.

FIG. 4 illustrates an exemplary system including components of an exemplary heat management service of the serverless managed database service of FIG. 1 according to some examples. The HMS 106 described above includes the placement engine 106 to select hosts on which to place new or existing database instances and the heat engine 108 to select instances to migrate and, optionally, to select hosts for remediation. The exemplary components 400 can be used for one or more of these functions.

At a high level, components 400 receive a candidate set 402 and output a scored candidate set 410 based on metrics data and/or host tracking metadata 405. For example, the components 400 can receive a candidate set 402 of hosts 120 and score those hosts to identify a host for the launch of new database instances or the migration of existing database instances. As another example, the components 400 can receive a candidate set 402 of hosts 120 and score those hosts to identify a host to evaluate for live migration. As yet another example, the components 400 can receive a candidate set 402 of database instances 124 on a particular host and score those database instances to identify a database instance to migrate to another host.

The exemplary components 400 include a filter 404, one or more rankers 406A-406N, and, optionally, weight/function 408A-408N associated with each ranker 406. The filter 404 filters candidates from a candidate set 402, which may be a set of hosts or instances on a host, depending on the application. The filter 404 may filter the candidates based on various metrics in the metrics data and/or host tracking metadata 405. Each candidate that passes the filter is ranked, or scored, by the one or more rankers 406. Each ranker 406 scores a candidate based on one or more metrics in the data 405. The weight/function 408 can serve to normalize and/or scale the raw scores generated by the associated ranker 406. The one or more scores for a candidate can be summed to generate a final score for the candidate, which can be stored along with the candidate in a scored candidate set 410. The engine performing the scoring can then select the "best" candidate from the scored candidate set 410.

With regard to the placement engine 106, the candidate set 402 can be each host in a set of hosts that support database instances (e.g., host 120A, 120B, and others). The filter 404 can filter the candidate set based on one or more dimensions.

In some examples, the filter 404 filters host systems that have a target resource usage 207 at the total target resource limit 208. In other examples, the filter host systems that have a target resource usage 207 less than some threshold below the total target resource limit 208. In some examples, the filter 404 filters host systems that have a flag or other indication that the host is currently the target of a placement or migration operation. In some examples, the filter 404 filters host systems that the HMS 106 determine have a discrepancy between the total instance-level metrics reported by the instance agents 126 on a particular host and the host-level metrics reported by the host agent 122, if available. In some cases, the difference between those values may exceed some threshold, indicating that a database instance has failed release memory back to the host-typically memory allocations.

Various rankers can be used for the placement engine 106. In some examples, a ranker 406 for the placement engine 106 can score a host based on the difference between the target resource usage 207 and the total target resource limit 210 for a particular resource or CU (e.g., the resource capacity available for placement 214). The ranker 406 can assign better scores to hosts having greater placement capacity.

In some examples, a ranker 406 for the placement engine 106 can score a host based on an expected growth of database instances on that host. Referring to FIG. 2, the ranker 406 can determine a growth rate for DB instances A, B, and C based on historic metrics reported for each database instance and apply that growth rate to a future time horizon. For example, the ranker 406 can calculate a growth rate (whether positive or negative) for each DB instance over the past 24 hour period and forecast the resource usage for those DB instances over the next 24 hour period. The ranker can then score the host based on a difference between that forecasted usage level and the total target resource limit 210, thereby favoring hosts with a slower (or even negative) heat growth even if their current resource capacity available for placement 214 may be less than others.

In examples where hosts that are the target of a placement or migration are not filtered, a ranker 406 can score the host based on the number of placement or migration operations targeting the host. Such data can be updated and stored in the host tracking datastore as part of heat management operations. Thus, the ranker 406 can assign better scores to hosts having fewer (or no) pending launch operations.

In some examples, the scored candidate set 410 may be empty (e.g., if all of the hosts in the candidate set 402 were filtered). In such cases, the SMDBS may have a buffer of empty hosts 120 from which to draw. For example, the SMDBS 102 can maintain a 10% buffer of empty hosts. Once utilization of the existing hosts 120 has reached the point where a scored candidate set 410 is empty, the placement engine 107 can select one of the empty hosts. The empty host provides additional capacity with which the heat management services can then begin to mitigate and/or remediate heat on the previous set of host systems.

Once the placement engine 106 has generated the scored candidate set 410, the placement engine 106 can select the "best" host for the launch operation. In some examples, the placement engine 106 can randomly select a host from the hosts having the top N scores.

With regard to the heat engine 106, the heat engine 106 may use the components 400 in two manners: to rank hosts in terms of their heat and to rank instances as migration candidates. Taking the latter first, the candidate set 402 for instance migrations can be all of the database instances hosted by a particular host. When evaluating instances to migrate, the heat engine 106 typically does not filter any of the hosted database instances on the host. In some examples, however, the number of instances that can be migrated from a host system may be limited (e.g., a one live migration per-host limit). In such cases, the filter 404 can filter any hosts from the candidate set 402 that are a source of a pending live migration as indicated in the host tracking metadata 405.

Various rankers can be used for the heat engine 106 when evaluating database instances to migrate. In some examples, a ranker 406 can score database instances based on their current target resource level (e.g., the load-based dynamic targets 207). In some cases, the ranker 406 can score database instances with a lower target resource level better (e.g., to reduce the "size" of the live migration), while in other cases, the ranker 406 can score database instances with a higher target resource level better (e.g., to increase the resulting available resource capacity after the live migration). Other rankers may be based on other database instance attributes, such as the minimum or maximum performance level associated with the database instance.

In some examples, a ranker 406 can score database instances based on their activity level. Since live migration is performed by copying the state of one database instance to another host, higher activity levels can increase the number of transfers to match the state of the target domain to that of the source since a memory page that changes on the source after being transferred to the target has to be transferred again. The ranker 406 can evaluate the activity level based on one or more metrics (e.g., CPU usage, memory usage, and/or network usage). In some examples, such metrics are used as an indirect proxy of the page mutation rate of the database instance, where higher page mutation rates affect the amount of data transfer associated with the live migration. In some examples, the ranker 406 can use the actual page mutation rate if monitored and reported (e.g., via a daemon).

In some examples, an initial ranker 406 can divide the filtered candidate set into tiers and subsequent rankers can score candidates within each tier. For example, the initial ranker 406 can divide the filtered candidate set into tiers based on the associated minimum performance level associated with the database instances. For example, the ranker 406 can de-duplicate and sort the minimum performance level associated with each database instance into groups, and associate each instance with its corresponding minimum performance level group. Subsequent rankers can score each candidate within a group, and the heat engine 106 can select a database instance from the preferred group (e.g., whether that preference is for smaller database instances to reduce live migration transfer time or for larger database instances to increase free capacity post-migration is implementation-specific). In some examples, the heat engine 106 can randomly select a database instance from the preferred group (e.g., without any subsequent rankers scoring database instances within a group).

With regard to the heat engine 106 ranking hosts in terms of heat to identify a host for instance-evaluation, the candidate set 402 can be each host in a set of hosts that support database instances (e.g., host 120A, 120B, and others). The filter 404 can filter the candidate set based on one or more dimensions. In some examples, the filter 404 filters host systems that have a target resource usage 207 below the total target resource limit 208. In other examples, the filter host systems that have a target resource usage 207 within some threshold of the total target resource limit 208. In some examples, the filter 404 filters host systems that have a flag or other indication that the host is currently the source of migration operation.

Rather than rank the filtered candidates, the heat engine 106 can, in some examples, randomly select a host from the filtered set of candidates. In other examples, various rankers can be used for the heat engine 106 in evaluating host heat. Such rankers can be similar to those described above for the placement engine 108 but with the scoring is inverted (e.g., hosts that are better candidates for the placement engine 108 are worse candidates for the heat engine 106 and vice versa).

Although an exemplary set of filters and rankers is described above, a person of ordinary skill in the art could, based on the disclosure and teachings provided herein, employ other filters or rankers, and combine those filters or rankers in different ways (e.g., by combining rankers that produce scores where higher scores are qualitatively better with rankers that produce scores where lower scores as qualitatively better, by combining rankers in different ways, etc.).

Figure 5:
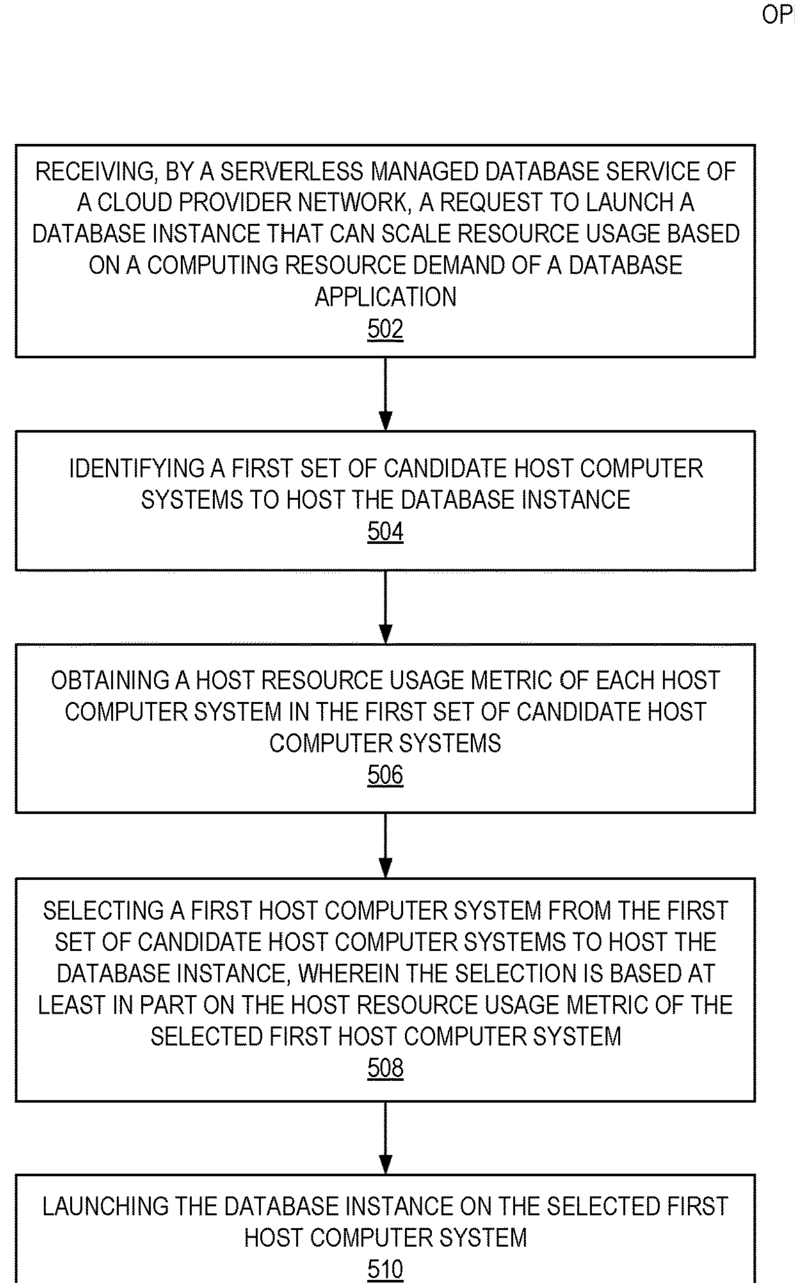
FIG. 5 is a flow diagram illustrating operations of a method for placement in a serverless managed database service according to some examples.

FIG. 5 is a flow diagram illustrating operations 500 of a method for placement in a serverless managed database service according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the SMDBS 102 of the other figures.

The operations 500 include, at block 502, receiving, by a serverless managed database service of a cloud provider network, a request to launch a database instance that can scale resource usage based on a computing resource demand of a database application. The operations 500 further include, at block 504, identifying a first set of candidate host computer systems to host the database instance. For example, SMDBS 102 can have tracking data that identifies each host 120 on which database instances can be launched. The placement engine 107 can filter an initial set based on one or more parameters. The operations 500 further include, at block 506, obtaining a host resource usage metric of each host computer system in the first set of candidate host computer systems. For example, the host resource usage metric can be sent from a host agent 122 of each host 120 or calculated from individual instance-level metrics sent from instance agents 126. The operations 500 further include, at block 508, selecting a first host computer system from the first set of candidate host computer systems to host the database instance, wherein the selection is based at least in part on the host resource usage metric of the selected first host computer system. For example, the placement engine 108 can select the second host computer system as described herein. The operations 500 further include, at block 510, launching the database instance on the selected first host computer system.

Figure 6:
FIG. 6 is a flow diagram illustrating operations of a method for heat management in a serverless managed database service according to some examples.
Figure 6:
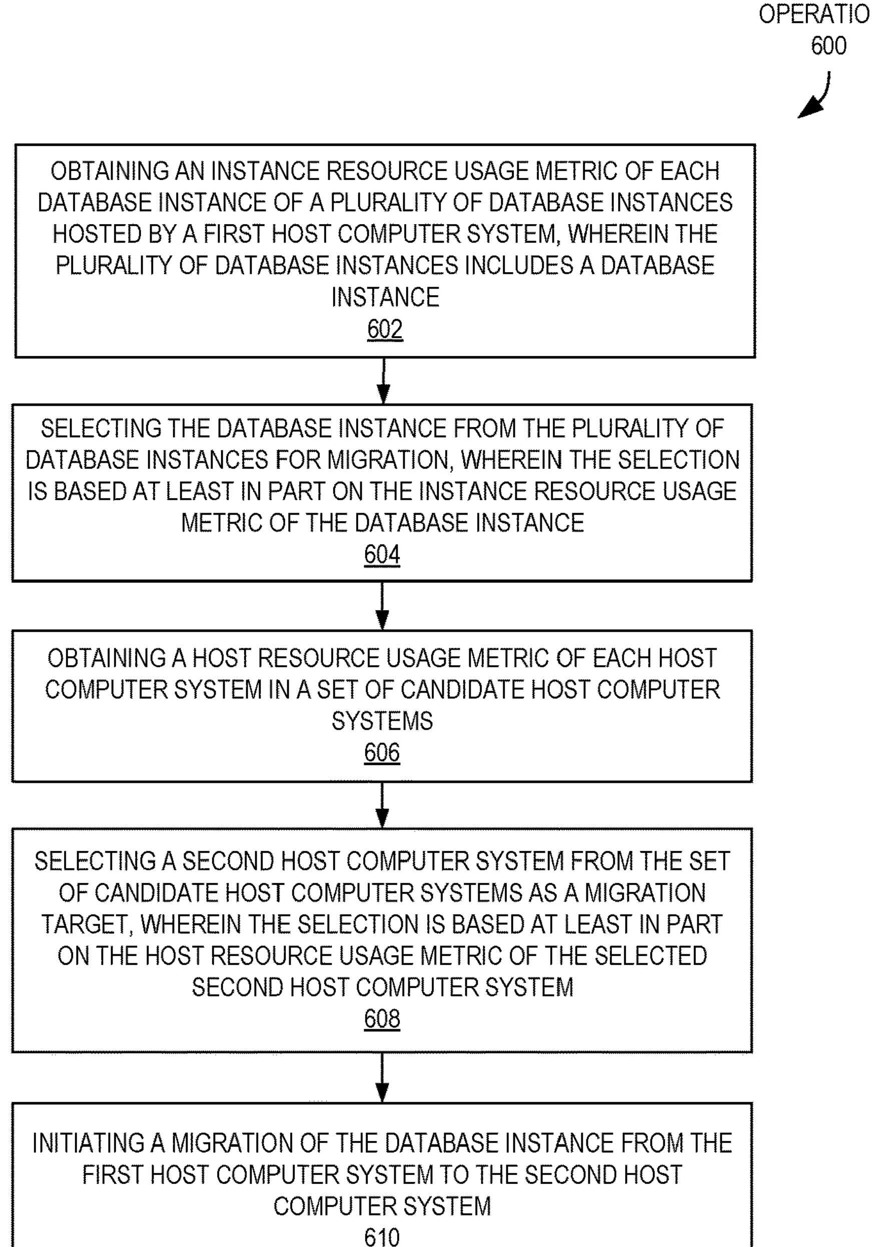

FIG. 6 is a flow diagram illustrating operations 600 of a method for heat management in a serverless managed database service according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by SMDBS 102 of the other figures.

The operations 600 include, at block 602, obtaining an instance resource usage metric of each database instance of a plurality of database instances hosted by a first host computer system, wherein the plurality of database instances includes a database instance. For example, the instance resource usage metric can be sent from instance agents 126 of each database instance on the first host computer system. The operations 600 further include, at block 604, selecting the database instance from the plurality of database instances for migration, wherein the selection is based at least in part on the instance resource usage metric of the database instance. For example, the heat engine 108 can select the database instance as described herein. The operations 600 further include, at block 606, obtaining a host resource usage metric of each host computer system in a set of candidate host computer systems (e.g., such as at block 506). The operations 600 further include, at block 608, selecting a second host computer system from the set of candidate host computer systems as a migration target, wherein the selection is based at least in part on the host resource usage metric of the selected second host computer system. For example, the placement engine 108 can select the second host computer system as described herein. The operations 600 further include, at block 610, initiating a migration of the database instance from the first host computer system to the second host computer system.

Figure 7:
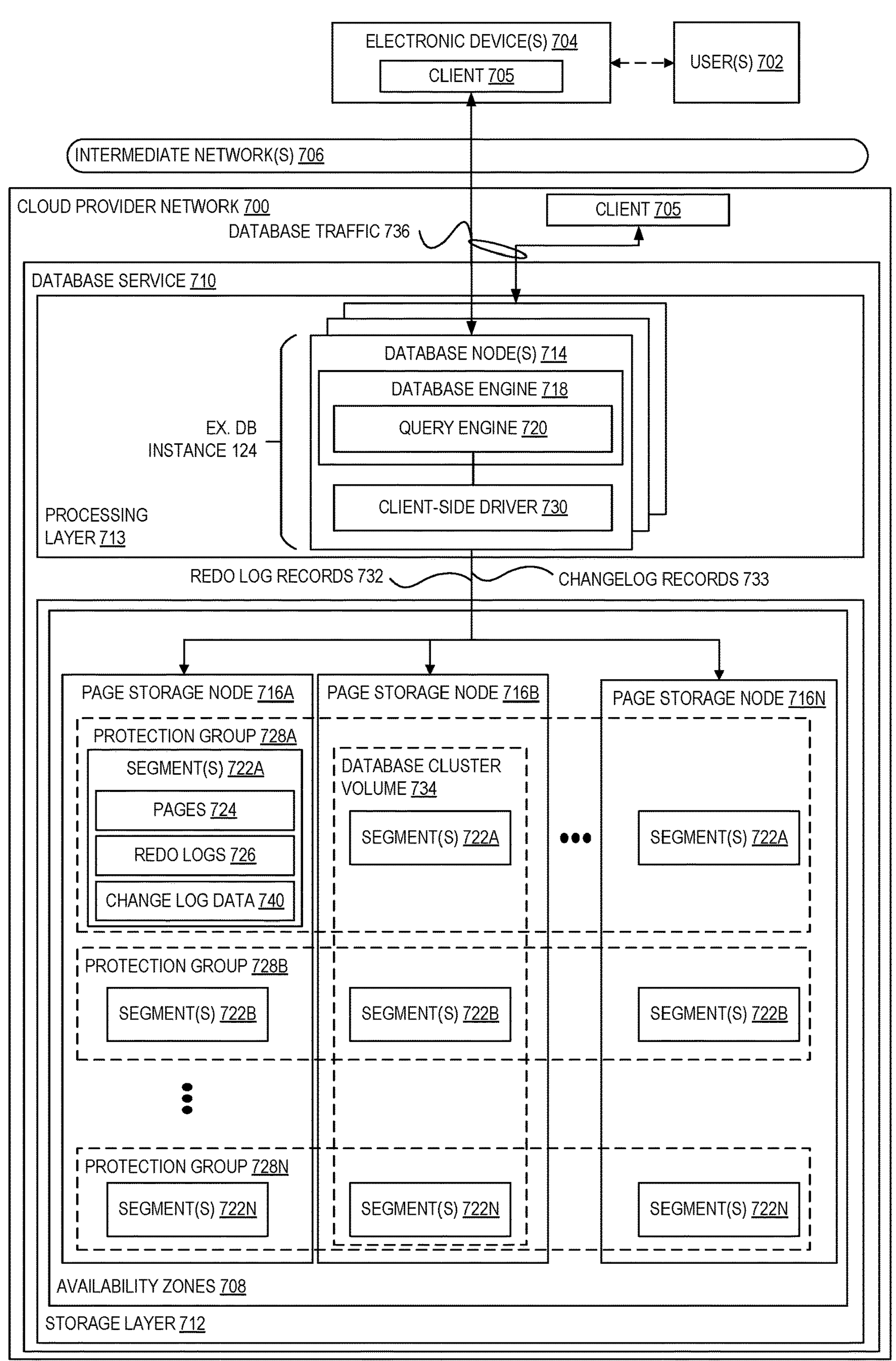
FIG. 7 illustrates an exemplary system including a distributed relational database service provided by a cloud provider network according to some examples.

FIG. 7 illustrates an exemplary system including a distributed relational database service provided by a cloud provider network according to some examples. The cloud provider network 700 illustrated in FIG. 7 includes a database service 710, among any number of other services. According to some examples, the database service 710 enables clients 705 of users to create, manage, and use databases (e.g., relational databases) in a cloud-based environment in a manner that provides enhanced security, availability, and reliability relative to other database environments. In some examples, the database service 710 features a distributed, fault-tolerant, and self-healing storage system that automatically scales (e.g., implemented in part using a scalable storage layer 712). In some examples, a database system provided by a database service 710 organizes the basic operations of a database (e.g., query processing, transaction management, caching, and storage) into multiple tiers or layers that can be individually and independently scalable. For example, in some examples, each database instance provided by the database service 710 includes a database processing layer 713 (which may include one or more database nodes 714, sometimes also referred to as "head nodes"), along with a separate and distributed storage layer 712 (which may include multiple page storage nodes 716 that collectively perform some of the operations traditionally performed in the database processing layer of existing database systems). In some examples, the database service 710 also includes a backup storage layer, etc. In some examples, database instances such as database instances 124 correspond to database nodes 714.

In general, a database is a set of data, collection of records, or other grouping of data objects stored in a data store. In some examples, a data store includes one or more directly or network-attached storage devices accessible to a database engine 718 (e.g., block-based storage devices like hard disk drives or solid-state drives). As indicated above, in some examples, the data store is managed by a separate storage layer 712. In some examples, management of the data store at a separate storage layer 712 includes distributing the data amongst multiple different storage nodes (e.g., page storage nodes 716A-716N) to provide redundancy and availability for the data.

In some examples, the data for a database is stored in one or more portions of the data store, such as data pages 724. One or multiple data values, records, or objects may be stored in a data page. In some examples, data pages further include metadata or other information for providing access to the database. For example, data pages can store data dictionaries, transaction logs, undo and redo log records, and so forth.

Generally, a "redo log" may be a write-ahead log of changes applied to contents of data pages, and can provide durability for all changes applied to the pages. Thus, each entry in a redo log may identify information describing a change to a database page, and the log entry can be used to modify a database page from a first state (prior to the change) to a second state (reflective of the change). Thus, the redo log includes "physical" type data reflective of how to change a "physical" representation of a "physical" database page, e.g., in terms of changing data that is stored via these pages. Thus, the redo log generally does not represent higher-level information such as the concept of transactions, tables, etc.

In contrast, a more "logical" type of log, such as a "binlog" (or WAL data segments of Postgres) store change information that is indicative of the type of change occurring in the database from the perspective of a database operation. For example, a binlog can store descriptions of events that indicate the changes made to the database being used, such as updates to values of one or more rows, an operation such as a new table being created or deleted, a column being added or deleted, etc. Binlogs can even provide information on statements that could have led to a potential change. Binlogs can be used to "replay" particular changes or "undo" particular changes to a database without being tied to any particular format or layout of the physical database pages; rather, binlog entries capture logical changes, that is, what database or table or record changes occurred.

A query engine 720 of a database engine 718 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some examples, some operations of a database (e.g., backup, restore, recovery, log record manipulation, and/or various space management operations) are offloaded from the database engine 718 to the storage layer 712 and distributed across multiple storage nodes 716 and storage devices. For example, in some examples, rather than a database engine 718 applying changes to a database (or data pages thereof) and then sending the modified data pages to the storage layer 712, the application of changes to the stored database (and data pages thereof) is the responsibility of the storage layer itself. According to some examples, a database engine 718 may operate using local copies of pages but instead sends "redo log" records, rather than modified data pages, to the storage layer. The storage layer then performs redo processing (e.g., the application of the redo log records) in a distributed manner (e.g., by a background process running on the page storage nodes 716A-716N), e.g., to form pages 724.

In some examples, log sequence numbers (LSNs) are assigned to the redo log records from a log sequence number space. Crash recovery (e.g., the rebuilding of data pages from stored redo log records) in some examples is performed by the storage layer 712 and may also be performed by a distributed background process. The storage layer maintains backup versions of data volumes in a separate storage system (e.g., in another storage service implemented as part of the cloud provider network 700) by leveraging peer-to-peer replication among storage nodes to identify and obtain new updates to data volumes for inclusion in backup versions.

In some examples, because only redo logs (and not modified data pages) are sent to the storage layer from the processing layer 713 there is comparatively much less network traffic between the database processing layer 713 and the storage layer 712 than in typical database systems. In some examples, each redo log may be on the order of one-tenth the size of the corresponding data page for which it specifies a change. Note that requests sent from the database processing layer 713 and the distributed storage layer 712 may be asynchronous and that multiple such requests may be in flight at a time.

In some examples, the database systems described herein may retain much of the structure of the "upper half" of a database instance (e.g., query parsing and query optimization layer, a query execution layer, and a transactionality and consistency management layer) in the processing layer 713 but may redistribute responsibility for at least portions of the backup, restore, snapshot, recovery, and various space management operations to the storage layer 712. Redistributing functionality in this manner and tightly coupling log processing between the database processing layer 713 and the storage layer 712 can improve performance, increase availability, and reduce costs when compared to traditional approaches to providing a scalable database, in some examples. For example, network and input/output (I/O) bandwidth requirements may be reduced because only redo log records (which are much smaller in size than actual data pages) may be sent across nodes or persisted within the latency path of write operations. In addition, the generation of data pages can be performed independently in the background on each storage node 716 (as foreground processing allows) without blocking incoming write operations. In some examples, the use of log-structured, non-overwrite storage may allow copy creation, backup, restore, snapshots, point-in-time recovery (PITR), and volume growth operations to be performed more efficiently, e.g., by using metadata manipulation rather than movement or copying of a data page. In some examples, the storage layer 712 may also assume the responsibility for the replication of data stored on behalf of clients (and metadata associated with that data, such as redo log records) across multiple storage nodes. For example, data and metadata of a database may be replicated locally (e.g., within a single availability zone 708 in which a collection of page storage nodes 716 executes on its own physically distinct, independent infrastructure) and across availability zones 708 in a single region or in different regions.

In some examples, database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

In some examples, each data page may be stored in a segment, such that each segment (e.g., segment 722A) stores a collection of one or more pages 724, redo logs 726, and change log data 740. The pages 724 may include data pages constructed based on the redo logs 726 and/or change log pages constructed based on the change log data 740. Thus, change logs and/or redo logs 726 may be segmented to the protection group 728 of which the segment is a member. In some examples, data pages and redo logs and change logs are mirrored across multiple storage nodes, according to a variable configuration, such as in a protection group 728 (which may be specified by the client on whose behalf the databases are being maintained in the database system). For example, in some examples, one, two, or three copies of the data or redo logs or change logs may be stored in each of one, two, or three different availability zones or regions, according to a default configuration, an application-specific durability preference, or a client-specified durability preference.

In some examples, a user's database created using a database service 710 is implemented by one or more database nodes 714, each hosting a database engine (e.g., database engine 718), and a fleet of page storage nodes 716. In some examples, a database engine 718 includes various components associated with a traditional database kernel, including a query engine 720 and other components implementing transactions, locking, buffer cache, access methods, and undo management. In some examples, a database engine 718 receives requests (e.g., queries to read or write data, etc.) from various client 705 applications, parses the requests, optimizes the requests, and develops an execution plan to carry out the associated database operations. In some examples, the database engine 718 returns query responses to client applications, which may include write acknowledgements, requested data pages (or portions thereof), error messages, and other responses as appropriate.

In some examples, a database node 714 is responsible for receiving SQL requests from client applications, e.g., through an Open Database Connectivity (ODBC) or Java Database Connectivity (JDBC) interface, and for performing SQL processing and transaction management (which may include locking) locally. However, rather than generating data pages locally and sending them for storage, the database node 714 (or various components thereof) may both update/generate a data page based on a change but also generate redo log records, and send these redo log records to the appropriate page storage nodes 716 of a separate distributed storage system. In some examples, a client-side driver 730 for the distributed storage system hosted on the database node 714 is responsible for routing redo log records 732 to the storage system node(s) 716 that store the segments to which those redo log records 732 are directed.

Additionally, in some cases users of the database service 710 may desire to enable change logs, e.g., in the form of binary logging (or "bin logging") via use of a binlog.

Generally, a binlog is one type of change log that may be a set of one or more files containing a record of all statements that attempt to change table data of the database (e.g., updates, insertions, deletions). These statements can be replayed to bring secondary servers up to date in a replication scenario, to bring a database up to date after restoring table data from a backup, etc. In many databases, change logging can be turned on and off.

Thus, in some implementations, for database statements that change table data of the database, another stream of data—in the form of change log records 733—is also sent to ones of the page storage nodes 716 and stored as change log data 740.

In some examples, each segment 722 of a database is replicated (or otherwise made durable) on multiple storage system nodes 716 that form a "protection group." In such examples, the client-side driver 730 tracks the page storage nodes 716 on which each segment is stored and routes redo log records 732 to all of the nodes on which a segment is stored (e.g., asynchronously and in parallel) when a client request is received. As soon as the client-side driver 730 receives an acknowledgment back from a write quorum of the page storage nodes 716 in the protection group (which may indicate that the redo log record has been written to the storage node), it sends an acknowledgment of the requested change to the database processing layer (e.g., to the database node 714). For example, in examples in which data is made durable through the use of protection groups 728, the database node 714 may not be able to commit a transaction until and unless the client-side driver 730 receives a reply from enough page storage nodes 716 to constitute a write quorum, as may be defined in a protection group policy for the data.

In some examples, the database processing layer 713 (or, more specifically, a database node 714) includes a cache in which recently accessed data pages are held temporarily. In such examples, if a write request is received that targets a data page held in such a cache, in addition to sending a corresponding redo log record 732 to the storage layer, the database engine applies the change to the copy of the data page held in its cache. A data page held in this cache may not ever be flushed to the storage layer and may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different examples. Note, however, that in examples that include such a cache, the cache may not be distributed across multiple nodes but may exist only on the database node 714 for a given database instance. Therefore, there may be no cache coherency or consistency issues to manage.

As indicated above, in some examples, a database node 714 includes a client-side storage driver 730, which routes read requests or redo log records 732 to various page storage nodes 716 within the storage layer 712, receives write acknowledgements from the storage layer 712, receives requested data pages from the storage layer 712, or return data pages, error messages, or other responses to a database engine 718. In some examples, the client-side driver 730 running on the database node 714 may expose a private interface to one or more other components (e.g., other database engines or virtual computing service components). In some examples, storage for a database instance in the storage layer may be modeled as a single volume that can grow in size without limits and that can have an unlimited number of Input/Output Operations Per Second (IOPS) associated with it. When a volume is created, it may be created with a specific size, with specific availability/durability characteristics (e.g., specifying how it is to be replicated) and with an IOPS rate associated with it (e.g., both peak and sustained). A variety of different durability models may be supported, and users may be able to specify, for their database, a number of replication copies, availability zones, or regions and whether replication is synchronous or asynchronous based upon their durability, performance, and cost objectives.

In some examples, the client-side driver 730 may maintain metadata about each volume and directly send asynchronous requests to each of the page storage nodes 716 necessary to fulfill read and write requests without requiring additional hops between storage nodes. In some examples, the volume metadata indicates which protection groups 728, and their respective page storage nodes 716, maintain which partitions of the volume. For example, in some examples, in response to a request to make a change to a database, the client-side driver 730 determines the protection group 728, and its one or more page storage nodes 716 that are implementing the storage for the targeted data page, and routes the redo log record(s) 732 specifying that change to those identified storage nodes. The page storage nodes 716 may then be responsible for applying the change specified in the redo log record to the targeted data page at some point in the future. As writes are acknowledged back to the client-side driver 730, the client-side driver 730 may advance the point at which the volume is durable and may acknowledge commits back to the database processing layer, in some examples. As previously noted, in some examples, the client-side driver 730 may not ever send data pages to the page storage nodes 716. This may not only reduce network traffic but may also remove the need for the checkpoint or background writer threads that constrain foreground processing throughout in previous database systems.

In some examples, many read requests may be served by the database node 714 cache. However, write requests may require durability since large scale failure events may be too common to allow only in-memory replication. Therefore, the systems described herein may minimize the cost of the redo log record write operations that are in the foreground latency path by implementing data storage in the storage layer as two regions: a small append-only log-structured region into which redo log records 732 are written when they are received from the database processing layer, and a larger region in which redo log records are coalesced together to create new versions of data pages in the background. In some examples, an in-memory structure may be maintained for each data page that points to the last redo log record for that page, backward chaining redo log records until an instantiated data block is referenced. This approach may provide good performance for mixed read-write workloads including applications in which reads are largely cached.

In some examples, copies of databases may be created in the storage layer that share data pages with the source of the copy. For example, a copy of a portion of a database (e.g., an extent of a database cluster volume 734) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 7, in some examples, the page storage nodes 716 also interface with a separate backup data store, system, service, or device. In this example, various data, such as data pages, redo log records, and any other data maintained by distributed storage service internal clients, such as database service 710 or other virtual computing services, or external clients, may be sent periodically to a backup data store.

In some examples, different storage policies are implemented by the database service 710. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some examples, the storage service may implement a higher durability for redo log records than for data pages, etc.

As indicated above, in some examples, a database service 710 replicates users' databases to provide resiliency to failure. In some examples, a user's database is partitioned into fixed size segments 722, each of which is replicated across the page storage nodes 716. In some examples, each set of fixed sized segments replicated across the page storage nodes 716 is grouped into a "protection group" (e.g., one of protection groups 728), such that each protection group consists of N fixed size segments organized across M availability zones 708. In some examples, a logical database cluster volume 734 used to store the data of a database is thus a concatenated set of protection groups 728, physically implemented using a fleet of storage nodes (e.g., including page storage nodes 716A-716N) provided as virtual hosts with attached SSDs. In some examples, the protection groups that constitute a volume are allocated as the volume grows, where the database service 710 may support volumes that can grow up to a defined size limit (e.g., 64 TB or any other limit).

In some examples, a page storage node 716 includes hardware and software implementing various segment management functions. For example, each storage node may perform any or all of the following operations: replication (e.g., locally within the storage node), coalescing of redo logs to generate data pages, log management (e.g., manipulating redo log records), crash recovery (e.g., determining candidate redo log records for volume recovery), creating snapshots of segments stored at the storage node, and space management (e.g., for a segment or state storage). In some examples, each page storage node 716 has one or more attached storage devices (e.g., SSDs, HDDs, or other persistent storage devices) on which data blocks may be stored on behalf of clients.

In some examples, each of the page storage nodes 716 implements processes running on the node that manage communication with one or more database node 714, for example, to receive redo log records 732, send back data pages, etc. In some examples, data blocks written to the storage system may be backed up to long-term or archival storage (e.g., in a remote key-value durable backup storage system).

In some examples, a storage layer 712 implements a storage service control plane that performs various storage system management functions. For example, a storage service control plane may implement a volume manager, which may maintain mapping information or other metadata for a database cluster volume 734, such as current volume state, current writer, truncation tables, or other truncation information, or any other information for a volume as it is persisted in varying extents, segments, and protection groups. In some examples, the volume manager communicates with a client-side driver 730 to "mount" or "open" the volume for the client, providing the client-side driver 730 with mapping information, protection group policies, and various other information used to send write and read requests to page storage nodes 716. The volume manager may provide the maintained information to storage clients, such as a database node 714 or client-side driver 730 or to other system components such as a backup agent. For example, the volume manager may provide a current volume state (e.g., clean, dirty, or recovery), current epoch or other version indicator for the volume, or any other information about a data volume.

FIG. 7 illustrates a process that includes a database node 714 processing database traffic 736. In some examples, clients 705 of the database service 710 may submit queries and other requests associated with a particular database instance in a number of ways, e.g., interactively via an SQL interface to the database system. In some examples, external applications and programs may submit queries using ODBC or JDBC driver interfaces to the database system.

In some examples, database traffic 736 is received and processed by the database instance, where the traffic includes operations that modify the content of the database. In some examples, clients 705 of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client 705 can include a database application, a media application, an office application, or any other application that makes use of persistent storage resources to store and access one or more databases. In some examples, such an application includes sufficient protocol support (e.g., for a suitable version of HTTP) for generating and processing network-based services requests without necessarily implementing full browser support for all types of network-based data. That is, a client 705 may be an application that can interact directly with the cloud provider network 700 or within the cloud provider network 700. In some examples, clients may generate network-based services requests according to a Representational State Transfer (REST)-style network-based services architecture, a document-based or message-based network-based services architecture, or another suitable network-based services architecture. Accordingly, a client 705 may be executed by a computing device 704 outside of the provider network 700 or within the provider network 700 (e.g., as an application executed by a hardware virtualization service, for example).

In some examples, the database traffic 736 is generated by a client 705 application that provides access to storage of databases or other applications in a manner that is transparent to those applications. For example, the client 705 application may integrate with an operating system or file system to provide storage in accordance with a suitable variant of the storage models described herein. However, the operating system or file system may present a different storage interface to applications, such as a conventional file system hierarchy of files, directories, or folders. In such an example, applications may not need to be modified to make sure of the storage system service model. Instead, the details of interfacing to the cloud provider network 700 may be coordinated by the client application and the operating system or file system on behalf of applications executing within the operating system environment. In some examples, the client application generating database traffic 736 send network-based services requests (e.g., a request to create a copy of a database, queries to a database, etc.) to and receive responses from the cloud provider network 700 via one or more intermediate networks 706.

In some examples, a cloud provider network 700 implements various user management features. For example, the cloud provider network 700 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some examples, a cloud provider network 700 also implements financial accounting and billing systems or may maintain a database of usage data that may be queried and processed by external systems for reporting and billing of client usage activity. In some examples, the cloud provider network 700 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some examples, such metrics may be used by system administrators to tune and maintain system components, while in other examples such metrics may be exposed to users to enable such users to monitor their usage of the database service 710 and other services.

In some examples, a cloud provider network 700 also implements user authentication and access control procedures. For example, for a given network-based services request to access a particular database instance, the cloud provider network 700 may ascertain whether the requesting client associated with the request is authorized to access the particular database instance. The cloud provider network 700 may determine such authorization by, for example, evaluating an identity, password, or other credential against credentials associated with the particular database, or by evaluating the requested access to the particular database against an access control list of the particular database, in some examples. For example, if a client does not have sufficient credentials to access a particular database, the cloud provider network 700 may reject the corresponding request, for example, by returning a response to the client indicating an error condition.

As indicated herein, when many traditional databases modify a data page (e.g., in response to a write operation), they generate a redo log record and invoke a log applicator that applies the redo log record to the in-memory before-image of the page to produce its after-image. Transaction commit requires the log to be written, but the data page write may be deferred. As described herein, in some examples of the database service 710, the writes that cross the network are redo log records 732. As shown in FIG. 7, a database engine 718 processing a write sends redo log records 732 to the storage layer 712.

In some examples, the log applicator functionality is implemented at the storage layer 712 where it can be used to generate database pages in the background or on demand. Generating each page from the complete chain of its modifications from the beginning of time may be prohibitively expensive and, thus, in some examples, each page storage node 716 continually or periodically materializes database pages in the background to avoid regenerating them from scratch on demand each time. The storage nodes use the redo log records (e.g., redo logs 726 associated with segment 722A) to apply changes to their buffer caches. The database engine awaits quorum from the storage nodes to satisfy the write quorum and to consider the redo log records in question durable or hardened.

As indicated above, database query requests of database traffic 736 typically include requests to write to various data pages of a database instance. These requests are parsed and optimized to generate one or more write record requests, which may be sent to the client-side driver 730 for subsequent routing to the storage system. In this example, the client-side driver 730 generates one or more redo log records 732 corresponding to each write record request and sends them to specific ones of the page storage nodes 716 of specific protection groups 728 storing the partition user data of user data space to which the write record request pertains. In some examples, page storage nodes 716 perform various peer-to-peer communications to replicate redo log records received at a storage node to other storage nodes that may not have received the redo log records. In some examples, the client-side driver 730 generates metadata for each of the redo log records that includes an indication of a previous log sequence number of a log record maintained at the specific protection group.

In some examples, each redo log record 732 is associated with an LSN that is a monotonically increasing value generated by the database. In some examples, a database node 714 continuously interacts with the storage layer 712 and maintains state to establish quorum, advance volume durability, and register transactions as committed. As the database receives acknowledgements to establish the write quorum for each batch of redo log records, it advances the current volume durable LSN (VDL). As noted, a data volume may consist of multiple extents, each represented by a protection group consisting of one or more segments. In some examples, redo log records 732 directed to different extents may have interleaved LSNs. For changes to the volume to be durable up to a particular LSN, it may be necessary for all redo log records up to that LSN to be durable, regardless of the extent to which they belong. In some examples, the client-side driver 730 keeps track of outstanding redo log records that have not yet been made durable, and once all redo log records up to a specific LSN are made durable, it may send a volume durable LSN (VDL) message to one of the protection groups in the volume. The VDL may then be written to all synchronous mirror segments for the protection group.

As described above, in some implementations of a distributed database service 710, (at least) two important streams of data may be sent from the database nodes 714 to the storage layer (e.g., page storage nodes 716)—the redo log records 732 and, if enabled, change log records 733.

Many users want to utilize the change log, e.g., to track data changes related to change data capture (CDC) for auditing, copying data to another system, reacting to events, etc. However, in many database systems, the use of a change log (e.g., the binlog in MySql) is typically disabled by default. This is partially because, when enabled, the performance of the database goes down significantly—perhaps as much as 75%—which further makes the database not scalable. This is because, for every database transaction, the database engine 718 generates these two streams: redo log records 732 and change log records 733. These records need to be persisted in an atomic manner (e.g., using a "2 phase commit" (2PC) technique), which drops the overall performance of the system significantly. Further, when users need to read this change log data—on top of the writing of the change log data, as well as the writing of the redo logs, and the use of the redo logs for regular database use—the reader occupies a lot of computing resource(s) (e.g., the CPU) of the page storage nodes 716 and/or database nodes 714, and thus the foreground I/O is reduced even further (e.g., as the CPU is less available for regular databases operations). Accordingly, there exists a strong need to enable change logs/binlogging in distributed database systems for replication, auditing, and other reasons, but without the significant negative effects that arise as a result, such as the typical performance degradations.

Figure 8:
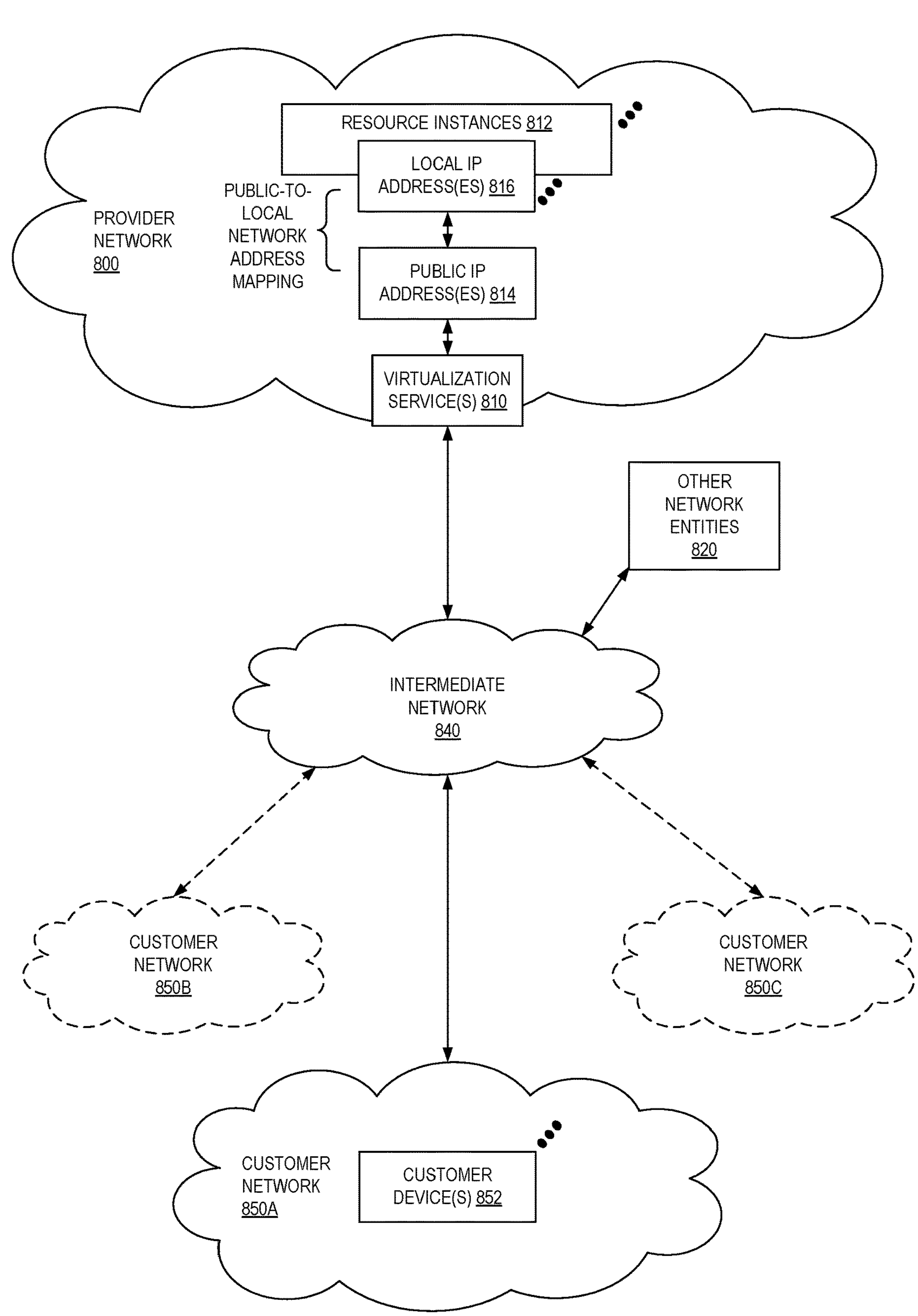
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
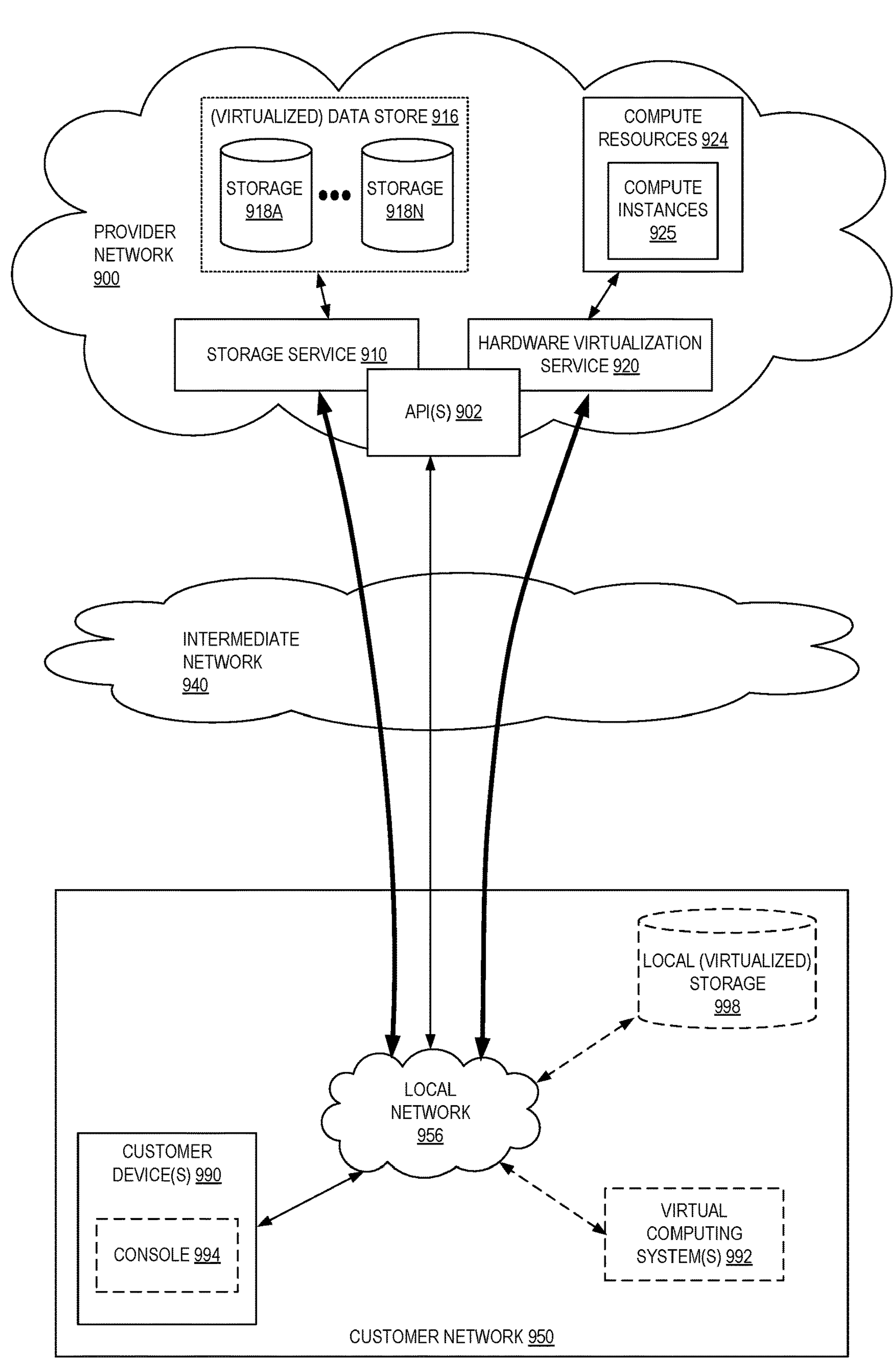
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
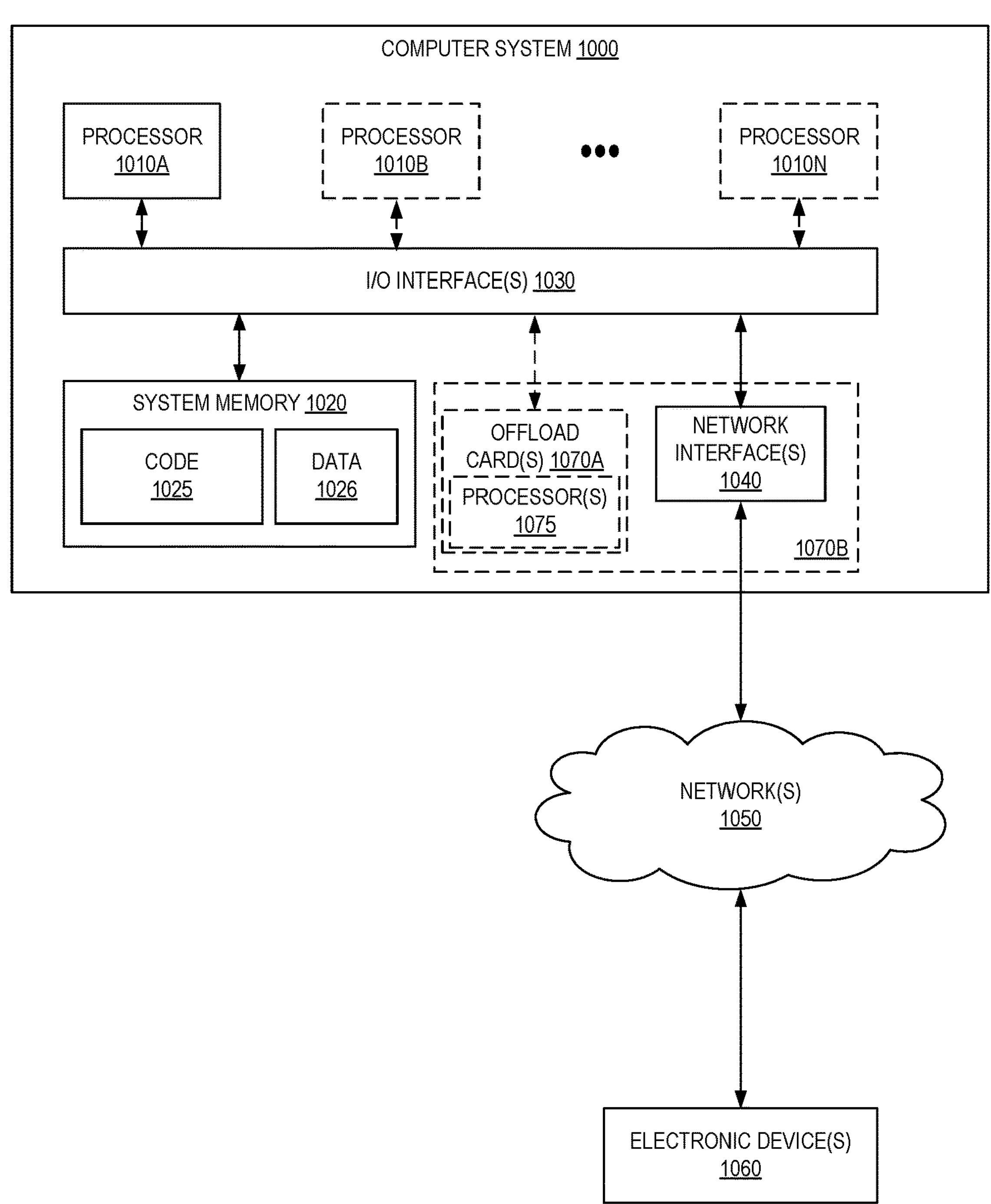
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as code 1025 (e.g., executable to implement, in whole or in part, one or more components of the managed database service 102, one or more of the components of the hosts 120 such as agents 122, 126) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PUP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, by a serverless managed database service of a cloud provider network, a request to launch a database instance that can scale resource usage based on a computing resource demand of a database application;

identifying a first set of candidate host computer systems to host the database instance;

obtaining a host resource usage metric of each host computer system in the first set of candidate host computer systems;

selecting a first host computer system from the first set of candidate host computer systems to host the database instance wherein the host resource usage metric is based at least in part on a resource consumption of a database application executing in another database instance hosted by the selected first host computer system;

launching the database instance on the selected first host computer system, wherein the database instance is of a processing layer of a database of the serverless managed database service, wherein the processing layer is separate from a storage layer of the database;

selecting the database instance, of a plurality of database instances hosted by the first set of candidate host computer systems, for migration to another host computer system, wherein the selection is based at least in part on an analysis of instance resource usage metrics of the plurality of database instances, the instance resource usage metrics including a page mutation rate; and initiating a migration of the database instance from the first host computer system to a second host computer system.

2. The computer-implemented method of claim 1, further comprising:

obtaining the instance resource usage metrics of each database instance of the plurality of database instances;

obtaining an updated host resource usage metric of each host computer system in a second set of candidate host computer systems; and selecting the second host computer system from the second set of candidate host computer systems as a migration target, wherein the selection is based at least in part on the updated host resource usage metric of the selected second host computer system.

3. The computer-implemented method of claim 2, further comprising:

identifying a third set of candidate host computer systems having a resource consumption above a first threshold, wherein the third set of candidate host computer systems includes the first host computer system; and selecting the first host computer system from the third set of candidate host computer systems, wherein the selection of the first host computer system from the third set of candidate host computer systems is based on at least one of a score of the first host computer system or a random selection of the first host computer system from the third set of candidate host computer systems.

4. A computer-implemented method comprising:

receiving, by a serverless managed database service of a cloud provider network, a request to launch a database instance that can scale resource usage based on a computing resource demand of a database application;

identifying a first set of candidate host computer systems to host the database instance;

obtaining a host resource usage metric of each host computer system in the first set of candidate host computer systems;

selecting a first host computer system from the first set of candidate host computer systems to host the database instance; and launching the database instance on the selected first host computer system;

selecting the database instance, of a plurality of database instances hosted by the first set of candidate host computer systems, for migration to another host computer system, wherein the selection is based at least in part on an analysis of instance resource usage metrics of the plurality of database instances, the instance resource usage metrics including a page mutation rate; and initiating a migration of the database instance from the first host computer system to a second host computer system.

5. The computer-implemented method of claim 4, further comprising:

obtaining the instance resource usage metrics of each database instance of the plurality of database instances;

obtaining an updated host resource usage metric of each host computer system in a second set of candidate host computer systems; and selecting the second host computer system from the second set of candidate host computer systems as a migration target, wherein the selection is based at least in part on the updated host resource usage metric of the selected second host computer system.

6. The computer-implemented method of claim 5, further comprising:

identifying a third set of candidate host computer systems having a resource consumption above a first threshold, wherein the third set of candidate host computer systems includes the first host computer system; and selecting the first host computer system from the third set of candidate host computer systems, wherein the selection of the first host computer system from the third set of candidate host computer systems is based on at least one of a score of the first host computer system or a random selection of the first host computer system from the third set of candidate host computer systems.

7. The computer-implemented method of claim 6, wherein the selection of the first host computer system from the third set of candidate host computer systems is based at least in part on the score of the first host computer system, and further comprising:

calculating the score based at least in part on a difference between a total target resource usage of each database instance of the plurality of database instances and a total target resource limit.

8. The computer-implemented method of claim 1, wherein the selection of the database instance is based at least in part on a score of the database instance, the selection further comprises:

calculating a score of the database instance based at least in part on a measure of a page mutation rate of the database instance, wherein the measure of the page mutation rate is a measure received from a kernel daemon executing in the database instance or an indirect measure of the page mutation rate by at least one of a compute resource usage of the database instance, a memory resource usage of the database instance, or a network throughput usage of the database instance.

9. The computer-implemented method of claim 4, wherein the selection of the first host computer system is based at least in part on a score of the first host computer system, and further comprising:

calculating the score based at least in part on a sum of an average resource usage over a period of time of each database instance of a plurality of database instances hosted by the first host computer system.

10. The computer-implemented method of claim 4, wherein the request includes an indication of a maximum resource usage and of a minimum resource usage of the database instance, the database instance to scale resource usage between the maximum resource usage and the minimum resource usage, and wherein identifying the first set of candidate host computer systems comprises filtering each host system having available resource capacity less than the minimum resource usage from a fleet of host computer systems.

11. The computer-implemented method of claim 4, wherein the first host computer system hosts a plurality of database instances including the database instance, each database instance having an associated maximum resource usage of a computing resource, and wherein a sum of the maximum resource usage for each database instance exceeds an amount of the computing resource available on the first host computer system.

12. The computer-implemented method of claim 4, wherein the host resource usage metric is based at least in part on a resource consumption of a database application executing in another database instance, and wherein the resource consumption is obtained from an agent executing in the same environment as the database application.

13. The computer-implemented method of claim 4, wherein the set of candidate host computer systems is a fleet of host computer systems dedicated to the serverless managed database service.

14. The computer-implemented method of claim 4, wherein the database instance is of a processing layer of a database of the serverless managed database service, wherein the processing layer is separate from a storage layer of the database.

15. A system comprising:

a first host computer system of a cloud provider network; and a first one or more electronic devices to implement a serverless managed database service in the cloud provider network, the serverless managed database service including instructions that upon execution cause the serverless managed database service to:

receive a request to launch a database instance that can scale resource usage based on a computing resource demand of a database application;

identify a first set of candidate host computer systems to host the database instance;

obtain a host resource usage metric of each host computer system in the first set of candidate host computer systems;

select the first host computer system from the first set of candidate host computer systems to host the database instance;

launch the database instance on the first host computer system;

select the database instance, of a plurality of database instances hosted by the first set of candidate host computer systems, for migration to another host computer system, wherein the selection is based at least in part on an analysis of instance resource usage metrics of the plurality of database instances, the instance resource usage metrics including a page mutation rate; and initiate a migration of the database instance from the first host computer system to a second host computer system.

16. The system of claim 15, further comprising the second host computer system of the cloud provider network, wherein the serverless managed database service includes further instructions that upon execution cause the serverless managed database service to:

obtain the instance resource usage metrics of each database instance of the plurality of database instances;

obtain an updated host resource usage metric of each host computer system in a second set of candidate host computer systems; and select the second host computer system from the second set of candidate host computer systems as a migration target, wherein the selection is based at least in part on the updated host resource usage metric of the second host computer system.

17. The system of claim 16, wherein the serverless managed database service includes further instructions that upon execution cause the serverless managed database service to:

identify a third set of candidate host computer systems having a resource consumption above a first threshold, wherein the third set of candidate host computer systems includes the first host computer system; and select the first host computer system from the third set of candidate host computer systems, wherein the selection of the first host computer system from the third set of candidate host computer systems is based on at least one of a score of the first host computer system or a random selection of the first host computer system from the third set of candidate host computer systems.

18. The system of claim 17, wherein the selection of the first host computer system from the third set of candidate host computer systems is based at least in part on the score of the first host computer system, and wherein the serverless managed database service includes further instructions that upon execution cause the serverless managed database service to:

calculate the score based at least in part on a difference between a total target resource usage of each database instance of the plurality of database instances and a total target resource limit.

19. The system of claim 15, wherein the selection of the database instance is based at least in part on a score of the database instance and wherein the serverless managed database service includes further instructions that upon execution cause the serverless managed database service to:

calculate the score of the database instance based at least in part on a measure of a page mutation rate of the database instance, wherein the measure of the page mutation rate is a measure received from a kernel daemon executing in the database instance or an indirect measure of the page mutation rate by at least one of a compute resource usage of the database instance, a memory resource usage of the database instance, or a network throughput usage of the database instance.

20. The system of claim 15, wherein the selection of the first host computer system is based at least in part on a score of the first host computer system, and wherein the serverless managed database service includes further instructions that upon execution cause the serverless managed database service to:

calculate the score based at least in part on a sum of an average resource usage over a period of time of each database instance of a plurality of database instances hosted by the first host computer system.

* * * * *